United States Patent
Lachowicz et al.

(10) Patent No.: US 7,385,016 B2
(45) Date of Patent: Jun. 10, 2008

(54) CURABLE RESIN COMPOSITIONS AND PROCESS FOR PREPARING OLIGOMERS CONTAINING ACRYLATE GROUPS AND SUBSTITUTED METHACRYLATE GROUPS

(75) Inventors: Artur Lachowicz, Berlin (DE); Kai-Uwe Gaudl, Hohen Neuendorf (DE); Gerwald Grahe, Berlin (DE)

(73) Assignee: Dainippon Ink & Chemicals, Inc., Tokyo (JP)

( * ) Notice: Subject to any disclaimer, the term of this patent is extended or adjusted under 35 U.S.C. 154(b) by 0 days.

(21) Appl. No.: 10/322,749

(22) Filed: Dec. 19, 2002

(65) Prior Publication Data

US 2003/0171523 A1    Sep. 11, 2003

(30) Foreign Application Priority Data

Dec. 21, 2001  (DE) ................. 101 63 432

(51) Int. Cl.
*C08F 4/00*     (2006.01)
*C08F 20/20*   (2006.01)

(52) U.S. Cl. ............... 526/193; 526/323.1; 526/328; 515/10

(58) Field of Classification Search ............. 525/471, 525/539, 10; 528/220; 526/312, 328, 329, 526/193, 323.1; 560/178, 183, 205
See application file for complete search history.

(56) References Cited

U.S. PATENT DOCUMENTS

| | | | | |
|---|---|---|---|---|
| 3,840,369 A | * | 10/1974 | Carlick et al. | 430/285.1 |
| 4,277,319 A | * | 7/1981 | Nyi et al. | 522/173 |
| 5,011,513 A | * | 4/1991 | Zador et al. | 51/295 |
| 5,166,410 A | * | 11/1992 | Fried | 560/205 |
| 5,760,080 A | * | 6/1998 | Wada et al. | 524/559 |
| 5,767,211 A | | 6/1998 | Guan | 526/171 |
| 5,945,489 A | * | 8/1999 | Moy et al. | 525/471 |
| 6,025,410 A | * | 2/2000 | Moy et al. | 522/182 |
| 6,294,598 B1 | * | 9/2001 | Karmann et al. | 524/93 |
| 6,673,851 B2 | * | 1/2004 | Moy et al. | 522/173 |
| 2003/0073757 A1 | * | 4/2003 | Moy et al. | 522/176 |

FOREIGN PATENT DOCUMENTS

JP     11-322818     * 11/1999

\* cited by examiner

*Primary Examiner*—Helen L Pezzuto
(74) *Attorney, Agent, or Firm*—Edwards Angell Palmer & Dodge LLP

(57) ABSTRACT

A curable resin composition which exhibits excellent hardness of their curing products as well as storage stability is provided, and a simple method to obtain acrylated resins is provided. The composition comprises a curable oligomer which has an acryloyl group and a substituted methacrylate group represented by the following structure

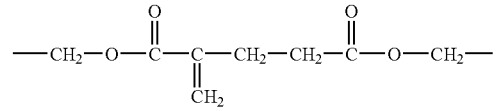

The process comprises a reaction step of reacting at least one monomeric multifunctional acrylate in the presence of a tertiary organic phosphine.

13 Claims, No Drawings

CURABLE RESIN COMPOSITIONS AND PROCESS FOR PREPARING OLIGOMERS CONTAINING ACRYLATE GROUPS AND SUBSTITUTED METHACRYLATE GROUPS

BACKGROUND OF THE INVENTION

1. Field of the Invention

This invention relates to curable compositions comprising soluble oligomers having acryloyl groups and substituted methacrylate groups, and a process for preparing said oligomers. These oligomers may be self-crosslinked by radiation or crosslinked in reactions with other resins. The oligomers of this invention are useful as binders in curable inks and coatings.

2. Description of Related Art

Resins having acryloyl groups are widely used in industry, as for example as coating materials for paper, wood, metal and plastic, in printing inks, adhesives and sealants. The hardening of the materials having acryloyl groups is achieved by polymerization of the acryloyl groups with electron beam or with the help of a radical initiator. Furthermore, acrylates are able to crosslink with other reactive resins, such as unsaturated polyesters, polyacetoacetates or polyamines. The commercial production of resins, containing acryloyl groups, is performed by esterification of polyols with an excess of acrylic acid (Prepolymers and Reactive Diluents for UV- and EB-curable Formulations, P.K.T. Oldring (Ed.), SITA Technologies, London, UK, 1991, Page 124, 131).

However, the curing composition containing said esterification products containing acryloyl groups has a drawback which is lacking in hardness and in storage stability. Furthermore, though said esterification is widely used, this process bears several drawbacks. Acrylic acid, for example is rather unstable at elevated reaction temperatures and carries the risk of spontaneous uncontrolled polymerization, if not properly inhibited. The high viscosity of the prepared acrylate resins is another problem, aggravating the elimination of the excess of acrylic acid and the acidic catalyst after the reaction. Additional solvents are added to reduce the viscosity, so that the excess of acrylic acid as well as the acidic catalyst can be removed by repeated washing with alkaline aqueous solutions. The purification by distillation, often used in the case of low molecular monomeric acrylates, is not possible. The commercially used alternative method to obtain arcylated resins, the transesterification of polyols with monomeric short chain alkyl acrylates, exhibits, besides the above mentioned purification problems, also the problem of the separation of the formed alkyl alcohols during the reaction. These alkyl alcohols must be removed to proceed the reaction without removing the alkyl acrylates, which is difficult due to the small difference in boiling points, so that long and effective packed separation column are necessarily required.

BRIEF SUMMARY OF THE INVENTION

It is therefore an object of the invention to provide a curable resin composition which exhibits excellent hardness of their curing products as well as storage stability, and to provide a simple method to obtain acrylated resins.

Inventors found that said problems were solved by using oligomers having acryloyl groups which are produced by reacting di-, tri-, tetra-, penta- and hexacrylate monomers, which are commercially available commodity and are produced in high volume, in the presence of tertiary organic phosphines.

Accordingly, the present invention provides a curable resin composition comprising a curable oligomer having an acryloyl group and a substituted methacrylate group represented by the following structure.

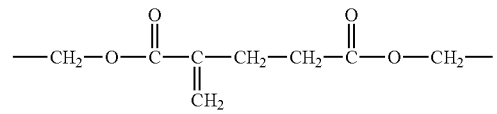

Another object of the present invention is to provide a process for preparing a curable oligomer which has an acryloyl group and a substituted methacrylate group represented by the following structure,

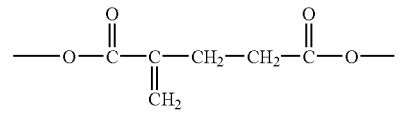

comprising a reaction step of reacting at least one monomeric multifunctional acrylate in the presence of a tertiary organic phosphine.

DETAILED DESCRIPTION OF THE INVENTION

According to the present invention, curable resins are formed, which contain reactive acryloyl groups and reactive substituted methacrylate groups only by foregoing simple way. The curable resin compositions thereof are useful as UV-curable and thermosetting products.

The process of this invention is characterized in that the reaction of di-, tri-, tetra-, penta- and hexafunctional acrylate monomers among each other in the presence of tertiary organic phosphines, does not give crosslinked, solid and insoluble products, but soluble oligomer, having reactive acryloyl groups and reactive substituted methacrylate groups. It is amazing that the reaction of especially tri-, tetra- and higher functionalized monomeric acrylates does not result in crosslinking as seen with a radical initiator such as peroxo- or azo-initiators.

As the formation of the oligomers containing acryloyl groups and substituted methacrylate groups (hereinafter abbreviated to "the oligomers of this invention") is achieved by a simple mixing process, the preparation is simplified compared to the commercially applied processes. No volatile splitting products are formed, no solvents are used and no further purification is required. Moreover, the scope of the product properties is wide as the process can be applied to any monomeric compound, containing two or more acryloyl groups. As the reaction proceeds also at room-temperature, the risk of an uncontrolled premature polymerization of the acryloyl groups is unlikely.

Monomeric di-, tri-, tetra-, penta-, and hexafunctional acrylates, useful for the preparation of the oligomers of this invention as starting materials are for example 1,4-butanediol diacrylate, 1,6-hexandiol diacrylate, dipropylenglycol diacrylate, neopentylglycol diacrylate, ethoxylated neopentylglycol diacrylate, propoxylated neopentylglycol diacrylate, tripropylene glycol diacrylate, bisphenol-A diacrylate, ethoxylated bisphenol-A diacrylate, poly(ethylene)glycol diacrylate, trimethylolpropane triacrylate, ethoxylated trimethylolpropane triacrylate, propoxylated trimethylolpropane triacrylate, propoxylated glycerol triacrylate, tris(2-hydroxyethyl)isocyanurate triacrylate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate or mixture thereof.

Tertiary organic phosphines useful for the preparation of the oligomers of this invention as catalysts are for example triethylphosphine, tripropylphosphine, triisopropylphosphine, tributylphosphine, triisobutylphosphine, tri-tertiarybutylphosphine, tris(2,4,4-trimethylpentyl)phosphine, tricyclopentylphosphine, tricyclohexylphosphine, tri-n-octylphosphine (TOP), tri-n-dodecylphosphine, trivinylphosphine, tribenzylphosphine, dimethylphenylphosphine, cyclohexyldiphenylphosphine, dicyclohexylphenylphosphine, 1,2-bis(diphenylphosphino)ethane, 1,3-bis(diphenylphosphino)propane, 1,4-bis(diphenylphosphino) butane, tertiary arylphosphines, activated by electon donating groups —OR or —NR$_2$ (R═H, C$_1$-C$_{12}$-alkyl, C$_1$-C$_{12}$-aryl) as for example diphenyl (2-methoxphenyl)phosphine, tris(4-methoxyphenyl)phosphine, tris(2,6-dimethoxyphenyl)phosphine, tris(4-dimethylaminophenyl)phosphine, tertiary alkylphosphines, containing phosphorous bound hetero atoms as for example hexamethylenetriaminophosphine and hexaethylenetriaminophosphine. Preferred among the above-exemplified tertiary organic phosphines are tiralkylphosphines having C5-10 alkyl groups in the scope of anti-hydrolysis property of their products.

The oligomers of this invention are prepared by mixing the monomeric di-, tri-, tetra-, penta-, and hexafunctional acrylates and the tertiary organic phosphines, then reacting them. The tertiary organic phosphines may be added all in once or in portions or continuously. After the addition a slight exothermic reaction is observed. The amount of the added tertiary organic phosphines is within the range of 0.1 to 25% by weight, preferred 1.5 to 10% based on the total amount of the composition. The reaction is usually completed after several minutes. The obtained products show viscosity in the range of 200-100000 mPas at 25° C. and a number molecular weight (Mn) in the range of 300-15000. It is also possible to perform the reaction at elevated temperatures of 30-140° C. The products are colorless or slightly yellow. The viscosity and the molecular weight of the oligomers of this invention is controlled by the amount of catalyst and the acrylate functionality of the monomeric acrylate starting material. As a rule, the higher the average acrylate functionality of the mixture and the higher the amount of added phosphine catalyst, the higher the achieved molecular weight and viscosity.

In a preferred embodiment, the tertiary organic phosphines is added in small portions, preferably drop by drop, so as to keep the temperatures being within the range of 30 to 140° C., preferred 60 to 90° C. Thus, higher molecular weights are obtained compared to the method where the catalyst is added all at once at room-temperature. Therefore, if the producing process for an oligomer with a defined molecular weight is desired, the addition of catalyst in small portions can save the catalyst, thereby the addition leads to a cost advantage over the addition of the catalyst all in once.

Analytical methods revealed, that the oligomers of this invention also contain a certain amount of substituted methacrylate groups. The hydrogen atoms of the substituted methacrylate groups have been proven in proton nuclear magnetic resonance spectroscopy at σ=6.2 and 5.6 ppm besides the signals for the acrylate groups. The $^{13}$Carbon nuclear magnetic resonance spectroscopy confirms the presence of substituted methacrylate groups of the following structure

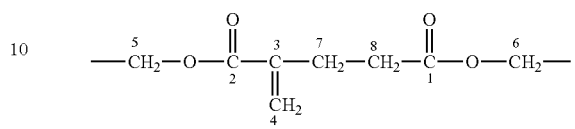

The chemicals shifts of carbon atoms 1-8 of the structure depicted above, measured from the product in example 1, are shown in the table below:

| C-atom | $C^1$ | $C^2$ | $C^3$ | $C^4$ | $C^5$ | $C^6$ | $C^7$ | $C^8$ |
|---|---|---|---|---|---|---|---|---|
| σ (ppm) | 172 | 166 | 139 | 125 | 61 | 60 | 33 | 27 |

The oligomers of this invention are formed by the reaction of two acryloyl groups at a time, resulting in substituted methacrylate groups which link the acrylate monomers together. In this way, oligomers and lower polymers are created. Completely unforeseen was the observation, that the reaction of the acryloyl groups among each other proceeds only partially and leaves behind a stable resin having adequate acryloyl groups, which may be crosslinked later by light or heat. As the reaction is self-terminating within a short time period, a liquid soluble acrylated resin is created. The degree of oligomerization is controlled by the amount of the tertiary organic phosphines. The more tertiary organic phosphines is used as catalyst, the higher the obtained molecular weight and viscosity. The formed substituted methacrylate groups are polymerizable themselves as well and may also later increase the glass transition temperature of the hardened product, since methacrylates show higher glass transition temperatures than acrylates. The oligomers of this invention are storage stable. Once the reaction fades away, there is no further increase in viscosity, even not at elevated temperatures. Storage stability tests of the oligomers of this invention at 60° C. over two weeks did not show any stability problems.

The oligomers of this invention contain an adequate amount of acrylic groups, which were not consumed during the oligomerization process and which are now useful to enable crosslinking reactions, leading to cured products, as for example solvent resistant coatings.

The curable resin composition of the invention comprises the foregoing oligomers as essential components and does not always need an initiator for their curing, because the oligomers have good self-closslinking ability by electron beam or UV radiation. Even if cured without any initiators, good harden products can be obtained, which may be used for solvent resistant coatings.

However, using initiators is more preferable for curing the oligomers. Namely the compositions of the invention further contain an initiator. Of course, the oligomers are also able to react with other compounds such as β-dicarbonyl compounds, amines or unsaturated polyesters.

As the initiator, there may be used any initiators such as a free radical initiator for example peroxo- or azo-initiators or a photo initiator.

A preferred curing method is the crosslinking by electron beam or UV radiation. In the latter method, photo initiators are dissolved in the oligomers of this invention.

The amount of added photo initiators is within the range of 0.5 to 12% by weight, preferred 2 to 7% by weight. Suitable photo initiators are selected from the group consisting of benzophenones, benzilketales, dialkoxy acetophenones, hydroxyalkylacetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxyacetophenone, diethoxyacetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl(2,4,6-trimethylbenzoyl) phosphinoxide, 2,4,6-trimethylbenzoylethoxyphenyl phosphinoxide, 2-isopropylthioxantone, 4-Isopropylthioxanthone, 2,4-dimethylthioxanthone.

The above mentioned photo initiators are state of the art and commercially available. The oligomers of this invention may be used as prepared or, if required, diluted with additional acrylate oligomers until the desired application viscosity is reached. The UV-curing of the oligomers of this invention in presence of photo initiators gives hard and colorless products, which are useful as coatings. The table shows the composition of radiation curable mixtures, their viscosity, the amount of applied radiation for curing and the solvent resistance and hardness of the cured coatings.

Another example for the use of the oligomers of this invention is the curing with unsaturated polyesters. In this application, unsaturated polyesters can be incorporated in the curable resin compositions.

To prepare the composition containing the unsaturated polyester, the oligomers are mixed with the unsaturated polyester and an initiator mixture is added. In the present examples the initiator mixture contains a peroxide and a metal salt coinitiator. The following table gives two examples of the curing of the oligomers of this invention together with unsaturated polyesters.

| System | Compositon | g | Solvent resistance | Pencil-hardness |
|---|---|---|---|---|
| 1 | Polylite CN 610* (unsaturated polyester, dissolved in 40% styrene) | 7.00 | | |
| | Product of example 1 | 3.00 | >75** | 4H** |
| | 2-Butanone peroxide | 0.10 | | |
| | OctaSoligen Cobalt 6 | 0.05 | | |
| 2 | Polylite CN 450* (unsaturated polyester, Dissolved in 2-hydroxyethylacrylate) | 6.00 | | |
| | Product of example 1 | 4.00 | >75** | 4H** |
| | 2-Butanone peroxide | 0.10 | | |
| | OctaSoligen Cobalt 6 | 0.05 | | |

*Products of DIC, Japan,
**after 72 hours, coating thickness approximately 80 μm

| System | Composition | Viscosity[2] | Radiation Intensity[1] | Solvent-resistance[3] | Pencil-hardness[4] |
|---|---|---|---|---|---|
| 1 | Product of example 1 | 96.0% | 880 mPas | 0.275 J/cm² | >75 DR | 5H |
| | Irgacure184 | 4.0% | | | | |
| 2 | Product of example 1 | 73.0% | 280 mPas | 0.275 J/cm² | >75 DR | 4H |
| | TPGDA[5] | 22.0% | | | | |
| | Irgacure 184 | 5.0% | | | | |
| 3 | Product of example 1 | 30.0% | 300 mPas | 0.275 J/cm² | >75 DR | 5H |
| | TPGDA | 33.5% | | | | |
| | EPAC[6] | 30.0% | | | | |
| | Darocur1173 | 6.5% | | | | |
| 4 | Product of example 1 | 30.0% | 290 mPas | 0.275 J/cm² | >75 DR | 4H |
| | TPGDA | 33.5% | | | | |
| | EPAC | 30.0% | | | | |
| | Darocur 1173 | 4.0% | | | | |
| | BzP[8] | 2.5% | | | | |
| | MDEA[7] | 1.5% | | | | |

[1]Applied radiation with a F300D-bulb (total UV-A-B-C)
[2]Viscosity of the coating solution prior to curing in mPascal seconds at 25° C..
[3]Solvent resistance of the cured coating, measured by repeated rubbing (double rubs DR) with a cotton cloth soaked in methylethyl ketone (MEK).
[5]tripropylenglycol diacrylate,
[6]bisphenol-A-dlglycidylether diacrylate,
[7]N-methyldiethanolamine,
[8]benzophenone,
Irgacure 184 = 1-hydroxycyclohexylphenylketone,
Darocure 1173 = 2-hydroxy-2-methylpropiophenone.

If desired, other resins or compounds having reactive groups, which are able to react with the acrylate groups and the substituted methacrylate groups in the the oligomers, can be incorporated in the curable resin composition of the invention.

As the other resins or compound having reactive groups, there can be mentioned, for example, unsaturated polyesters, or a compound having active hydrogen such as β-dicarbonyl compounds.

Another example for the application of the oligomers of this invention is the crosslinking in a Michael addition with compounds having active hydrogens such as β-dicarbonyls. In this application, compounds having active hydrogens can be incorporated in the curable resin compositions.

The curing proceeds in presence of a strong base such as 1,8-diazabicyclo(5.4.0)undec-7-ene, 1,5-diazabicyclo(4.3.0)non-5-ene or tetramethyl guanidine. The following table gives two examples of the curing of the oligomers of this invention together with acetoacetates and malonates.

| System | Composition | g | Solvent resistance | Pencil-hardness |
|---|---|---|---|---|
| 1 | Product of example 1 | 9.00 | | |
| | Bisacetoacetate, obtained from methyl acetoacetate and 2-ethyl-2-butylpropandiol | 1.00 | >75 | 3H |
| | *DBU | 0.20 | | |
| 2 | Product of example 1 | 5.00 | | |
| | Polymalonate, obtained from dimethylmalonate and ethylene glycol | 5.00 | >75 | 2-3H |
| | DBU | 0.20 | | |

*DBU = 1,8-diazabicyclo(5.4.0)undec-7-ene

Objects and advantages of this invention are further illustrated by the following examples, but the particular materials and amounts thereof recited in these examples, as well as other conditions and details should not be construed to limit this invention.

EXAMPLES

Example 1

200.0 g of trimethylolpropane triacrylate was heated to 85° C. and sparged with air. 2.0 g of tri-n-octylphosphine was added and the reaction temperature increased to 103° C., indicating the start of the reaction. Then 3.8 g of tri-n-octylphosphine was added dropwise so that the temperature did not exceed 106° C. Then, the mixture was stirred for another hour at 90° C. and was allowed to cool down to room temperature. The product exhibit a viscosity of 1300 mPas at 25° C. Molecular weight average Mw=1340.

Example 2

550.0 g of ethoxylated trimethylolpropane triacrylate (TMPEOTA, Trademark of UCB) was heated to 80° C. and sparged with air. Then, 20.0 g of tri-n-octylphosphine (TOP) was added in portions of 2.0 g in intervals of 3 minutes. During this procedure the reaction temperature increased to 106° C. After the addition of the catalyst, the reaction mixture was stirred for another hour at 100-105° C. and was then allowed to cool down to room temperature. The product shows a viscosity of 2700 mPas at 25° C. Molecular weight average Mw=3200, molecular number average Mn=1200.

Example 3

9.50 g of trimethylolpropane triacrylate (viscosity: 90 mPas at 25° C.) was treated with 0.35 g of tri-n-octylphosphine (TOP) at room temperature. After the addition of the catalyst, the temperature raised to 50° C. Then, the mixture was allowed to cool down to room temperature yielding a colorless solution. Viscosity: 400 mPas at 25° C. Molecular weight average Mw=950, molecular number average Mn=670° C.

Example 4

To 9.50 g of trimethylolpropane triacrylate (viscosity: 90 mPas at 25° C.), 0.35 g of tri-n-octylphosphine (TOP) was added dropwise at room temperature, whereas the temperature increased to 35° C. Then, the mixture was allowed to cool down to room temperature yielding a colorless solution. Viscosity: 700 mPas at 25° C. Molecular weight average Mw=1130, molecular number average Mn=950° C.

Example 5

To 9.50 g of trimethylolpropane triacrylate (viscosity: 90 mPas at 25° C.), 0.35 g of tri-n-octylphosphine (TOP) was added dropwise at 90° C. within a time period of 5 minutes. Then, the mixture was stirred for another hour at 90° C. and was then allowed to cool down to room temperature yielding a slightly yellow colored solution. Viscosity: 1100 mPas at 25° C. molecular weight average Mw=1430, Molecular number average Mn=1060° C.

Example 6

To 9.50 g of trimethylolpropane triacrylate (viscosity: 90 mPas at 25° C.), 1.00 g of tri-n-octylphosphine (TOP) was added dropwise under vigorous stirring whereas the temperature increased to approximately 60-70° C. The mixture was allowed to cool down to room temperature yielding a colorless solution. Viscosity: 23000 mPas at 25° C. Molecular weight average Mw=2560, molecular number average Mn=1290.

Example 7

To 9.00 g of trimethylolpropane triacrylate (viscosity: 90 mPas at 25° C.), 0.80 g of tri-n-dodecylphosphine was added dropwise under vigorous stirring whereas the temperature increased to 50° C. The mixture was allowed to cool down to room temperature yielding a colorless solution. Viscosity: 15000 mPas at 25° C. Molecular weight average Mw=2160, molecular number average Mn=1190.

Example 8

To 9.50 g of trimethylolpropane triacrylate (viscosity: 90 mPas at 25° C.), 0.50 g of tri-n-octylphosphine was added dropwise under stirring within a period of 10 minutes, whereas the temperature increased to 50° C. Then, the mixture was stirred for another hour at 90° C. before the mixture was allowed to cool down to room temperature, yielding a slightly yellow colored solution. Viscosity: 2500 mPas at 25° C. Molecular weight average Mw=1450, molecular number average Mn=1030.

Example 9

100.0 g of trimethylolpropane triacrylate was warmed to 90° C. and sparged with air. Then, 3.0 g of tri-n-octylphosphine was added, whereas the temperature increased to 102° C. Then, another 7.0 g of tri-n-octylphosphine was added in a way so that the reaction temperature did not exceed 106° C. After the addition of the catalyst, the mixture was stirred for another hour at 90° C. before the mixture was allowed to cool down to room temperature. Viscosity: 35000 mPas at 25° C. Molecular weight average Mw=6500, molecular number average Mn=3610.

Example 10

A mixture of 57.0 g of trimethylolpropane triacrylate, 37.0 g of tripropylene glycol diacrylate and 5.0 of 1-hydroxycyclohexyl phenyl ketone (Irgacure 184, Trademark of Ciba) was treated under stirring at room temperature with 5.0 g of tri-n-octylphosphine, whereas the reaction temperature raised to approximately 40-50° C. The mixture was allowed to cool down to room temperature. Viscosity: 200 mPas at 25° C.

Example 11

10.0 g of trimethylolpropane triacrylate was treated with 0.05 g of tris(4-methoxyphenyl)phosphine. Under stirring the solid catalyst started to dissolve and the temperature increased to approximately 45-55° C. Then, the mixture was allowed to cool down to room temperature and stirred for 24 hours at room temperature. Viscosity: 950 mPas at 25° C. Molecular weight average Mw=1370, molecular number average Mn=980.

Example 12

10.0 g of trimethylolpropane triacrylate was treated with 0.10 g of tris(4-methoxyphenyl)phosphine. Under stirring the solid catalyst started to dissolve and the temperature increased to 60° C. Then, the mixture was allowed to cool down to room temperature and stirred for 24 hours at room temperature. Viscosity: 7200 mPas at 25° C. Molecular weight average Mw=3780, molecular number average Mn=1360.

Example 13

10.0 g of trimethylolpropane triacrylate was treated with 0.10 g of dicyclohexylphenylphosphine. Under stirring the solid catalyst started to dissolve and the temperature increased to 45° C. after 5 minutes of stirring. Then, the mixture was allowed to cool down to room temperature, yielding a colorless solution having a viscosity of 3600 mPas at 25° C. Molecular weight average Mw=1812, molecular number average Mn=1115.

Example 14

10.0 g of trimethylolpropane triacrylate was treated with 0.25 g of dicyclohexylphenylphosphine. Under stirring the solid catalyst started to dissolve and the temperature increased to 60° C. after 5 minutes of stirring. Then, the mixture was allowed to cool down to room temperature, yielding a colorless solution having a viscosity of 92000 mPas at 25° C. Molecular weight average Mw=9182, molecular number average Mn=3812.

Example 15

50.0 g of pentaerithitol tetracrylate was treated with 1.5 g of tri-n-octylphosphine at room temperature. After 5 minutes of stirring the temperature increased to 50° C. Then, the mixture was allowed to cool down to room temperature, yielding a colorless solution having a viscosity of 1200 mPas at 25° C. Molecular weight average Mw=1040, molecular number average Mn=910.

Example 16

50.0 g of dipentaerithitol hexacrylate was sparged with air (0.21 per minute), warmed to 50° C. and treated with 1.5 g of tri-n-octylphosphine. After 5 minutes of stirring the temperature increased to 62° C. Then, the mixture was allowed to cool down to room temperature, yielding a colorless solution having a viscosity of 13600 mPas at 25° C. Molecular weight average Mw=1768, molecular number average Mn=1450.

Example 17

10.0 g of trimethylolpropane triacrylate treated with 0.20 g of hexamethylene triaminophosphine dissolved in 2.0 g of trimethylolpropane trimethacrylate. The mixture started to increase in temperature and exhibited after the reaction faded away a viscosity of 600 mPas at 25° C.

What is claimed is:

1. A curable resin composition comprising a curable oligomer which has an acryloyl group and a substituted methacrylate group represented by the following structure

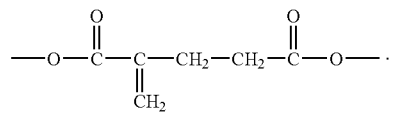

2. A curable oligomer according to claim 1, wherein the oligomer has a number molecular weight (Mn) of 300-15000 and a viscosity of 200-100000 mPas at 25° C.

3. A curable resin composition according to claim 1, wherein the curable resin composition further contains an initiator.

4. A curable resin composition according to claim 1, wherein the composition further contains an unsaturated polyester.

5. A curable resin composition according to claim 1, wherein the composition contains a compound having an active hydrogen atom.

6. A curable resin composition according to claim 5, wherein the compound having an active hydrogen atom is a β-dicarbonyl compound.

7. A curable resin composition according to claim 1, wherein the curable oligomer is produced by a reaction of at least one monomeric multifunctional acrylate in the presence of a tertiary organic phosphine.

8. A curable resin composition according to claim 1, wherein the curable oligomer is produced by a reaction of at least one monomeric multifunctional acrylate in the presence of a tiralkylphosphine having C5-10 alkyl groups.

9. A curable resin composition according to claim 8, wherein the reaction is carried out at a temperature within the range of 60 to 90° C.

10. A curable resin composition according to claim 7, wherein the multifunctional acrylate is an acrylate monomer having two to six acryloyl groups.

11. A curable resin composition according to claim 1, wherein the oligomer is a self-crosslinkable oligomer which is crosslinkable by electron beam or UV radiation.

12. A curable resin composition according to claim 1, wherein the substituted methacrylate group is obtained by a reaction between acryloyl groups of monomeric multifunctional acrylates.

13. A curable resin composition according to claim 1, wherein the composition is at least one of a UV-curable composition and a thermosetting composition.

* * * * *